United States Patent
Beuschel et al.

(10) Patent No.: US 11,236,839 B2
(45) Date of Patent: Feb. 1, 2022

(54) PNEUMATIC VALVE

(71) Applicant: Conti Temic Microelectronic GmbH, Nuremberg (DE)

(72) Inventors: Michael Beuschel, Stammham (DE); Alexander Kerler, Titting OT Petersbuch (DE); Johann Steinberger, Brunnen (DE)

(73) Assignee: Conti Temic Microelectronic GmbH

( * ) Notice: Subject to any disclaimer, the term of this patent is extended or adjusted under 35 U.S.C. 154(b) by 399 days.

(21) Appl. No.: 16/332,393

(22) PCT Filed: Sep. 20, 2017

(86) PCT No.: PCT/EP2017/073777
§ 371 (c)(1),
(2) Date: Mar. 12, 2019

(87) PCT Pub. No.: WO2018/065217
PCT Pub. Date: Apr. 12, 2018

(65) Prior Publication Data
US 2021/0018109 A1 Jan. 21, 2021

(30) Foreign Application Priority Data
Oct. 6, 2016 (DE) ...................... 10 2016 219 342.2

(51) Int. Cl.
*F16K 31/00* (2006.01)
*F03G 7/06* (2006.01)

(52) U.S. Cl.
CPC ............ *F16K 31/002* (2013.01); *F03G 7/065* (2013.01)

(58) Field of Classification Search
CPC ...... F16K 31/002; F16K 31/025; F16K 31/02; F16K 99/0038; F16K 99/0044; F03G 7/065; B60N 2/914; B60N 2/665
See application file for complete search history.

(56) References Cited

U.S. PATENT DOCUMENTS 3,613,732 A 10/1971 Willson et al.
6,499,509 B2 12/2002 Berger et al.
(Continued)

FOREIGN PATENT DOCUMENTS

CN 2055554 U 4/1990
CN 2234532 Y 9/1996
(Continued)

OTHER PUBLICATIONS

International Search Report and Written Opinion for International Application No. PCT/EP2017/073777, dated Nov. 28, 2017—6 pages.
(Continued)

*Primary Examiner* — Craig J Price
*Assistant Examiner* — Andrew J Rost
(74) *Attorney, Agent, or Firm* — RatnerPrestia

(57) ABSTRACT

A pneumatic valve, including a valve housing with an air chamber with one or more air ports. A respective air port of at least one of the air ports can be opened and closed by a movable valve flap which is mechanically coupled to a shape memory alloy. The SMA element deforms as a result of supplying electrical heating current and effects a predefined movement of the valve flap for opening or closing the respective air port. The deformation of the SMA element is reversed when the supply of the electrical heating current ends. The valve flap has a leaf spring. The leaf spring is held rotationally fixedly relative to the valve housing. The leaf spring interacts with the SMA element such that a stroke of the SMA element caused by the deformation is converted into a stroke of the valve flap by elastic bending of the leaf spring.

18 Claims, 5 Drawing Sheets

(56) References Cited

U.S. PATENT DOCUMENTS

| | | | |
|---|---|---|---|
| 6,843,465 B1* | 1/2005 | Scott | F16K 31/025 251/129.06 |
| 6,929,019 B2* | 8/2005 | Weinmann | F16K 31/006 137/15.21 |
| 7,140,391 B2 | 11/2006 | Eberhardt et al. | |
| 7,484,528 B2* | 2/2009 | Beyerlein | F16K 31/002 137/596 |
| 9,212,759 B2 | 12/2015 | Köpfer et al. | |
| 10,207,619 B2 | 2/2019 | Dankbaar et al. | |
| 10,290,879 B2 | 5/2019 | Ostadi et al. | |
| 10,522,278 B2* | 12/2019 | Beuschel | H01F 7/12 |
| 2003/0155539 A1 | 8/2003 | Ginggen | |
| 2016/0047482 A1 | 2/2016 | Kuhnekath | |
| 2016/0201816 A1 | 7/2016 | Rastegar | |

FOREIGN PATENT DOCUMENTS

| | | |
|---|---|---|
| CN | 104937320 A | 9/2015 |
| CN | 105829164 A | 8/2016 |
| DE | 10162498 A1 | 7/2003 |
| DE | 10257549 B3 | 8/2004 |
| DE | 102005060217 A1 | 7/2006 |
| DE | 102005059081 A1 | 2/2007 |
| DE | 102012212686 A1 | 1/2014 |
| DE | 102012222570 A1 | 6/2014 |
| DE | 102013220557 A1 | 4/2015 |
| EP | 1158182 A1 | 11/2001 |
| WO | 2005026592 A2 | 3/2005 |
| WO | 2014154239 A1 | 10/2014 |
| WO | 2015086089 A1 | 6/2015 |
| WO | 2015185132 A1 | 12/2015 |

OTHER PUBLICATIONS

German Examination Report for German Application No. 10 2016 219 342.2, dated Aug. 14, 2017—7 pages.
German Third Party Observations for German Application No. 10 2016 219 342.2, dated Jan. 8, 2019—11 pages.
German Third Party Observation for German Application No. 10 2016 219 342.2, dated Feb. 22, 2019, 5 pages.
Chinese Office Action for Chinese Application No. 201780060627.8, dated Dec. 4, 2019, with translation, 12 pages.

* cited by examiner

PNEUMATIC VALVE

CROSS REFERENCE TO RELATED APPLICATIONS

This application is the U.S. National Phase Application of PCT International Application No. PCT/EP2017/073777, filed Sep. 20, 2017, which claims priority to German Patent Application No. 10 2016 219 342.2, filed Oct. 6, 2016, the contents of such applications being incorporated by reference herein.

FIELD OF THE INVENTION

The invention relates to a pneumatic valve.

BACKGROUND OF THE INVENTION

Pneumatic valves are used for controlling air flows in a multiplicity of technical fields of application. Here, for the actuation of such valves, it is known to use so-called SMA elements composed of a shape memory alloy, such as for example NiTi alloy (SMA=Shape Memory Alloy). The SMA elements are deformed by means of a flow of current and the resulting heating. After subsequent cooling, they can resume their original shape.

For the actuation of pneumatic valves, SMA elements are commonly used in the form of wires. Here, the actuator stroke is effected by means of a contraction of the wire by means of a supply of current. In order to attain a long service life and thus a large number of actuation cycles, the contraction of the wire during actuation of the valve should be as small as possible. Accordingly, there are various approaches for converting the contraction of the wire into a larger valve stroke by means of a geometrical transmission ratio.

The document DE 102 57 549 B3, incorporated herein by reference, presents a mechanical series connection of SMA wires in order to increase the actuation stroke of a valve.

The documents WO 2015/185132 A1, incorporated herein by reference, and WO 2015/086089 A1, incorporated herein by reference, present pneumatic SMA valves, in the case of which the stroke of an SMA wire is converted by means of joints into the movement of a valve element.

The document DE 10 2005 060 217 A1, incorporated herein by reference, presents a pneumatic valve with SMA wires tensioned in a triangle configuration, to which plungers for the opening and closing of valve openings are attached.

The document DE 10 2005 059 081 A1, incorporated herein by reference, discloses a rotary actuator with a traction element composed of shape memory alloy. The actuator converts a traction movement of the traction element into a rotational movement.

SUMMARY OF THE INVENTION

An aspect of the invention is an operating pneumatic valve with at least one SMA element as actuator.

The pneumatic valve according to an aspect of the invention comprises a valve housing in which there is provided an air chamber with one or more air ports, wherein a respective air port of at least one part of the air ports can be opened and sealingly closed by means of a movable valve flap. The valve flap is mechanically coupled to an SMA element and in particular to an SMA element in wire form composed of a shape memory alloy (for example an NiTi alloy). In a manner known per se, the SMA element deforms as a result of a supply of an electrical heating current, whereby a predefined movement of the valve flap is effected for the purposes of opening or closing the respective air port. The deformation of the SMA element is reversed when the supply of the electrical heating current is ended, whereby a reversal of the predefined movement of the SMA element is effected.

In the case of the pneumatic valve according to an aspect of the invention, the valve flap comprises a leaf spring, preferably composed of metal, with a spring leaf and preferably a single spring leaf, wherein the leaf spring is held rotationally fixedly, that is to say without a hinge, relative to the valve housing. The leaf spring is preferably fastened (without a hinge) directly to the valve housing. The valve flap with the leaf spring interacts with the SMA element such that a stroke of the SMA element caused by the deformation thereof is converted into a stroke of the valve flap by means of elastic bending of the spring leaf of the leaf spring. Here, the stroke of the valve flap is larger than the stroke of the SMA element.

In the case of the pneumatic valve according to an aspect of the invention, a leaf spring is used for generating an enlarged stroke of a valve flap. The leaf spring be fastened without play and without the interposition of a hinge, whereby a reliable actuation of the valve is realized. Furthermore, by means of the elastic bending of the leaf spring during the valve actuation, a peeling movement of the valve flap can be ensured, whereby even a valve flap adhering to the valve seat can be detached in an effective manner. By means of the conversion of the stroke of the SMA element into an enlarged valve stroke, small deformations of the SMA element are required for actuating the valve, whereby the service life of said SMA element is increased. The enlargement of the stroke is preferably realized by means of a lever arrangement.

The pneumatic valve according to an aspect of the invention is characterized in that the leaf spring interacts with the SMA element such that the stroke of the valve flap is diverted relative to the stroke of the SMA element. The angle by which the stroke of the valve flap is diverted relative to the stroke of the SMA element preferably lies between 50° and 130°, in particular between 70° and 100°, and is particularly preferably 90°, wherein the stated angles relate to the smaller angle between the directions of the two strokes. A compact construction of the valve according to an aspect of the invention can be achieved in this way.

In a further particularly preferred variant of the valve according to an aspect of the invention, the SMA element is a wire which extends substantially in a plane and which is contracted as a result of a supply of the electrical heating current and which hereby effects the predefined movement of the valve flap. Nevertheless, it is also possible for the SMA element to be of some other form; for example, it may possibly also be configured as a spring, such as for example a spiral spring.

If a wire that extends in a plane is used as an SMA element, said wire preferably runs substantially parallel to the spring leaf of the leaf spring with a predefined spacing thereto. By means of this predefined spacing, a short lever for the engagement of the SMA element can be realized, in order to hereby increase the stroke.

In a further particularly preferred embodiment, the wire that forms the SMA element comprises two straight-running portions with an interposed curved portion, wherein the stroke of the wire is transmitted via the curved portion to the valve flap. The curved portion preferably turns the direction of extent of the wire through 180°. The curved portion may act for example on a projection of the valve flap. With this variant of an aspect of the invention, a simple mechanical coupling of the wire to the valve flap is ensured.

In a further preferred variant, the spring leaf of the leaf spring comprises a bearing region which bears on a portion of the valve housing, wherein the bearing region lifts off from the portion of the valve housing during the elastic bending of the spring leaf. A simple and compact arrangement of the leaf spring on the valve housing is made possible in this way.

In a further embodiment of the valve according to an aspect of the invention, a resetting force acts on the valve flap, which resetting force effects the reversal of the movement of the valve flap when the supply of the heating current is ended. Depending on the embodiment, the resetting force may also be imparted by the leaf spring itself, which may be ensured by means of a corresponding prestress of the leaf spring. Alternatively or in addition, a separate spring may be provided for imparting the resetting force.

In a further variant of the valve according to an aspect of the invention, the valve flap comprises a body, composed in particular of plastic, which has a first side, which points towards the respective air port, and a second side, which is a side situated opposite the first side. Here, a portion of the spring leaf which is moved as a result of the elastic bending of the leaf spring is arranged on the first side. The SMA element is mechanically coupled to the valve flap preferably on the second side. This arrangement ensures a valve flap of stable design. Furthermore, by means of the body, a spacing of the SMA element from the leaf spring and thus a suitable lever arm can be ensured.

In a further variant of the valve according to an aspect of the invention, the valve housing comprises a foundation plate composed of non-conductive material, in particular of plastic. The foundation plate is preferably an injection-molded component. The foundation plate divides the interior of the valve housing into the air chamber, which is sealed off with respect to other regions, and a region separated from the air chamber, wherein, in the separated region, there is preferably arranged an electronic control unit for controlling the valve flap or valve flaps for the purposes of opening or closing the one or more respective air ports. By means of this variant of an aspect of the invention, sensitive components can be protected from the air stream in the air chamber and from moisture in the air chamber.

In a further variant, in which a bearing region of the spring leaf bears on a portion of the valve housing, the portion of the valve housing is a part of the foundation plate, described immediately above, on its side pointing towards the air chamber. A compact construction of the valve is achieved in this way.

In a further particularly preferred embodiment, the SMA element is led through a shield wall which shields a sub-portion of the SMA element from the respective air port, wherein the shield wall is preferably fastened to the valve flap or to the valve housing. In this embodiment, a variation of the characteristic of the SMA element owing to cooling by the air flow at the air port is avoided.

In a further variant of the valve according to an aspect of the invention, on the leaf spring, there is formed a conductive portion which, when an end position of the valve flap is reached when the electrical heating current is supplied, electrically bridges a sub-portion of the SMA element. This variant of an aspect of the invention permits simplified detection of the end position, because the decrease in resistance caused by the electrical bridging can be utilized for the detection of the end position.

In a further embodiment of the valve according to an aspect of the invention, a non-controllable air port, that is to say an air port without valve flap, bears on one end of the valve housing. Furthermore, the valve comprises two air ports, which comprise valve flaps and a corresponding actuation means with an SMA element according to the statements above. In one variant, the two air ports are arranged at that end of the valve housing at which the non-controllable air port is situated. It can be ensured in this way that the air stream is conducted only partially past the SMA element, and therefore does not adversely influence the characteristics of the SMA element. It is alternatively also possible for one of the two air ports to be arranged at that end of the valve housing at which the non-controllable air port is situated, and for the other of the two air ports to be arranged at an end of the valve housing situated opposite said end. In this way, a compact, elongate structure of the valve housing can be made possible. If appropriate, it is also possible for more than the stated two air ports to be provided. It is however preferable for precisely two such air ports to be provided.

The pneumatic valve according to an aspect of the invention is preferably provided for the filling and/or emptying of at least one elastic air bladder in a device for the pneumatic adjustment of a seat in a means of transport. In other words, an aspect of the invention also comprises a device for the pneumatic adjustment of a seat in a means of transport, having at least one elastic air bladder and having a valve according to an aspect of the invention for the filling and/or emptying of the at least one air bladder.

BRIEF DESCRIPTION OF THE DRAWINGS

Exemplary embodiments of aspects of the invention will be described in detail below on the basis of the appended figures, in which.

DETAILED DESCRIPTION OF THE PREFERRED EMBODIMENTS

Below, embodiments of aspects of the invention will be described on the basis of embodiments of pneumatic 3/3 valves which are used for the filling and venting of an elastic air bladder (not shown) in a device for the pneumatic adjustment of a motor vehicle seat. Nevertheless, the pneumatic valves described below may also be utilized for any other desired usage purposes.

Figure 1:
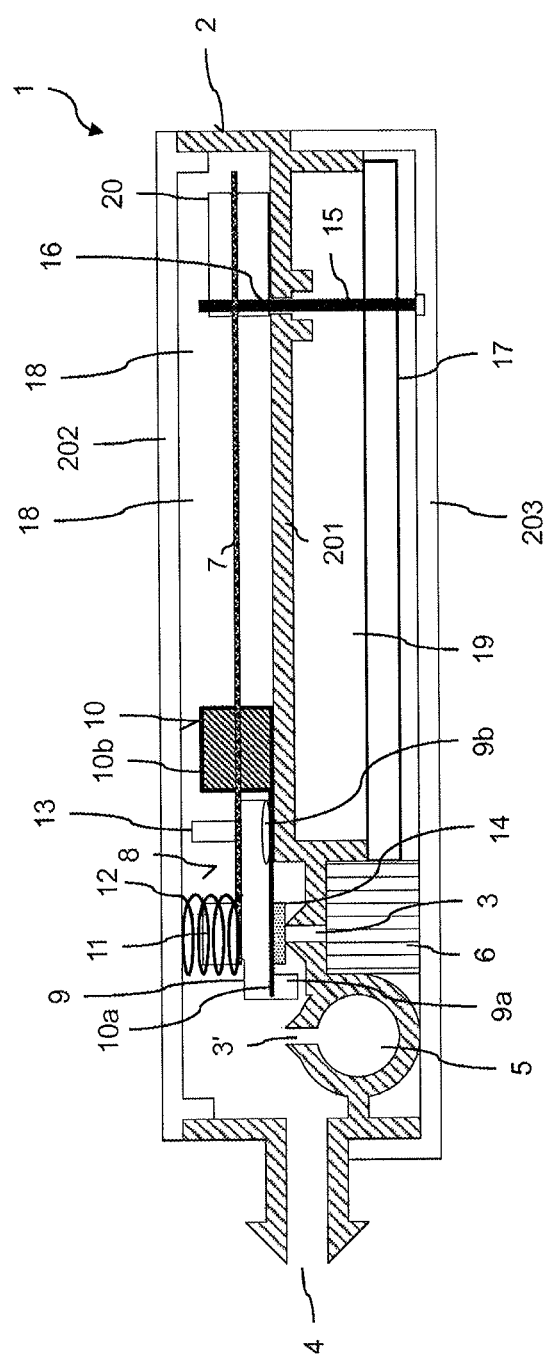
FIG. 1 and FIG. 2 show sectional views through a first embodiment of a valve according to an aspect of the invention in a closed position and in an open position of an air port.

FIG. 1 shows a sectional view through a first embodiment of a pneumatic valve according to an aspect of the invention. The section runs along the line I-I in the plan view of FIG. 3, wherein components situated outside the section plane are however also visible in FIG. 1.

Figure 2:
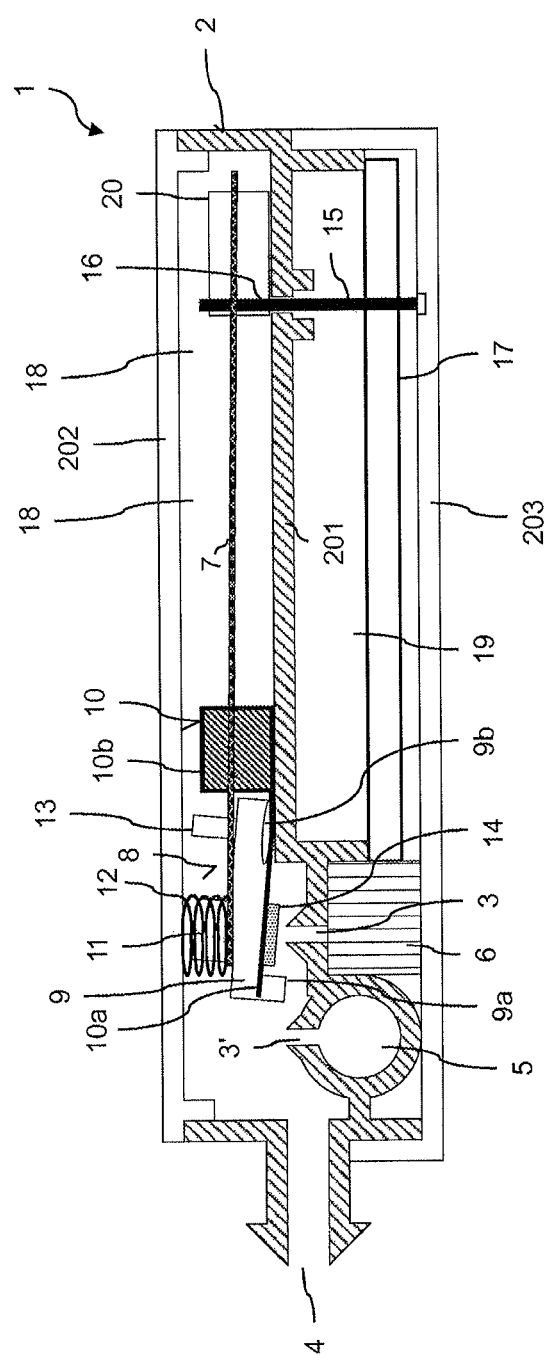
Figure 3:
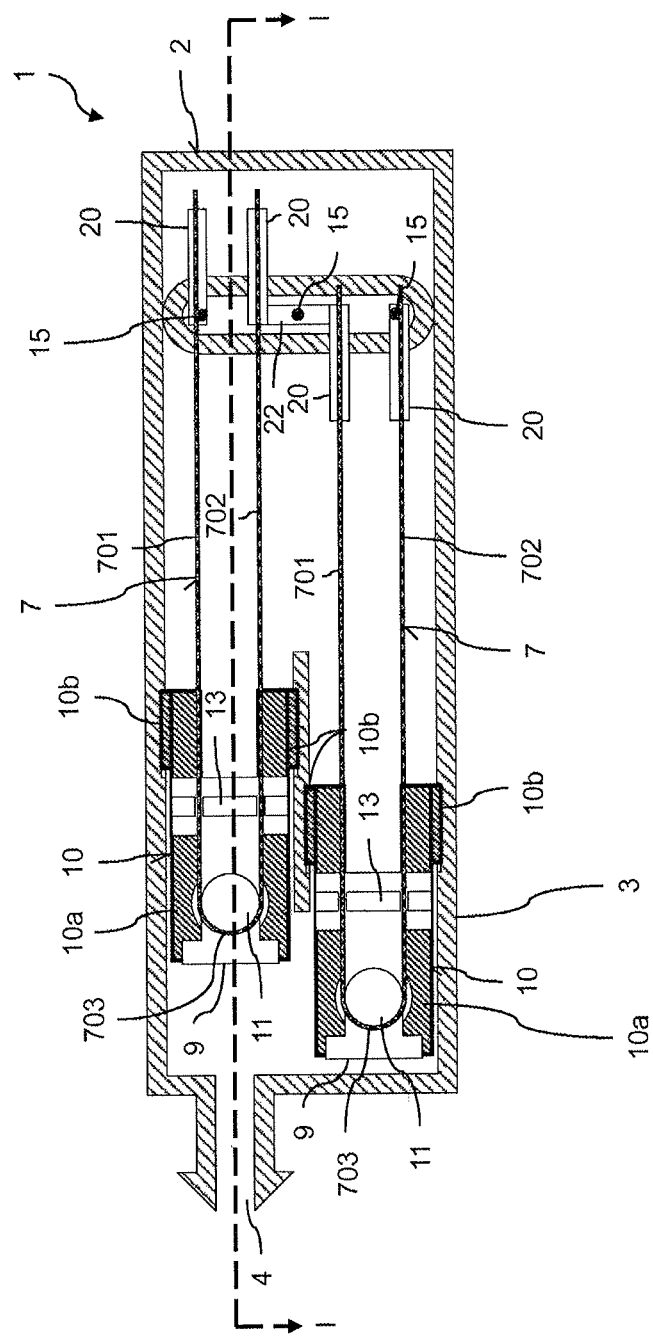
FIG. 3 shows a plan view of the embodiment of the valve from FIG. 1 and FIG. 2.

The valve shown in FIGS. 1 to 3 is denoted by the reference designation 1, and comprises a housing 2, in which multiple air ports are formed. FIG. 3 shows inter alia the non-controllable working port 4, via which, by means of the valve, air is conducted to an air bladder or conducted away therefrom. Furthermore, the valve comprises the two further air ports 3 and 3', which can be seen in FIG. 1. The air port 3 is an exhaust-air port, via which air is conducted out of the valve to the outside. Here, adjacent to the air port, there is provided a damping element 6 by means of which noises of the valve 1 that penetrate to the outside are reduced.

By contrast to the air port 3, the air port 3' is a feed air port, which is connected to an air channel 5 which in turn is attached to a compressed-air feed (not shown). The air ports 3 and 3' are controllable by means of movable valve flaps 8, that is to say the respective air ports can be opened and sealingly closed by means of the valve flaps. The individual valve flaps 8 comprise inter alia a valve body 9 composed of plastic and a leaf spring 10 composed of metal, as will be discussed in more detail below.

Below, on the basis of FIG. 1 to FIG. 3, the opening and closing of an exhaust-air port 3 by means of the illustrated valve flap 8 will be discussed, wherein, at the air port 3', the same actuation mechanism for the opening and closing thereof is provided analogously, as can be seen from the plan view in FIG. 3.

As per FIG. 1, an SMA wire 7 composed of a shape memory alloy known per se is tensioned in a horizontal direction. The wire 7 is fastened to the housing 2 and to corresponding contact pins 15 by crimping by means of metallic crimp elements 20. Here, the exact crimped connection is not essential to an aspect of the invention, and is thus not shown in detail in FIG. 1 to FIG. 3. Electrical heating current is fed to the wire via the contact pins 15. For this purpose, the contact pins 15 are connected to a circuit board 17 in the lower region of the housing, which circuit board controls the feed of the electrical heating power, wherein the voltage for the feed of the heating power originates for example from the on-board electrical system of the motor vehicle.

The guidance of the wire 7 can be seen again in the plan view of FIG. 3. As can be seen, the wire is fastened at its right-hand ends to the housing by means of respective crimp elements 20. In FIG. 3, the wire extends, proceeding from an upper crimp element 20 and an upper contact pin 15, initially as a straight portion 701 in the direction of the valve flap. There, said wire is led as a curved portion 703 around a cylinder 11 which protrudes from the valve flap. The wire subsequently issues into a straight portion 702 again, which leads to a further crimp element 20, which is connected by means of an electrically conductive web 22 to a central contact pin 15. The cylinder 11 is an integral constituent part of the valve body 9 composed of plastic. As is evident from FIG. 1, a spiral spring 12 is situated in the cylinder 11, which spiral spring prestresses the valve flap downward in order to close the air opening 3. A lid 202 of the housing 2 forms the counterbearing of the spring 12.

The housing 2 comprises not only the lid 202 and a base cover 203 but also a foundation plate 201 depicted by hatching, which foundation plate is illustrated in section in FIG. 1. The foundation plate has encircling walls and comprises the air ports 3, 3', 4 and the air channel 5. The foundation plate divides the valve housing 2 into an air chamber 18, in which the valve flap 8 and the mechanical actuation mechanism thereof including the SMA wire 7 is situated, and a region 19 separated from the air chamber, in which region the circuit board 17 with its electronic components is situated. The air chamber 18 is closed off in pressure-tight fashion with respect to the valve surroundings and with respect to the separated region 19. The circuit board is thus protected with respect to the air stream that is conducted through the air chamber 18.

As already mentioned, the contact pins 15 are attached to the circuit board 17, which contact pins are led via sealed leadthroughs 16 in the foundation plate 201 into the air chamber 18, and are connected there to the SMA wire 7. The foundation plate 201 is composed of dimensionally stable plastic, and is additionally stabilized by the lid 202 and the base cover 203. The lid may be adhesively bonded or welded to the foundation plate 201. Since the electrical components of the valve are seated on the separate circuit board 17, the foundation plate 201 requires no electrical conductor tracks, such that it can be manufactured from plastic. In particular, it constitutes an injection-molded component, whereby the integral formation of the air ports 3, 3' and 4 in the foundation plate is made possible. As material for the foundation plate, use is preferably made of a plastic which exhibits little warping and little distortion; it is also possible, if appropriate, for an insert to be provided in the region of the nozzles of the individual air ports, or the plastic may be formed from a different material at these locations. For example, the region of the valve nozzles may be produced from a plastic without fiber reinforcement, whereas the rest of the foundation plate comprises such fibers in order to increase the stability thereof. Through the use of non-reinforced plastic in the region of the nozzle seats, the sealing in the case of closed ports can be improved.

As already mentioned, the contact pins 15 are led through the foundation plate 201 via leadthroughs 16. Here, the foundation plate also has the task of sealing off the contact pins that are led through. This may be realized by virtue of the corresponding pins being molded in, by virtue of said pins being pressed in (possibly through an elastic seal), or by virtue of said pins being adhesively bonded.

The valve flap 8 comprises not only the valve body 9 but also the leaf spring 10 which comprises the spring leaf 10a itself, which in FIG. 1 runs perpendicular to the plane of the drawing and thus in a horizontal direction. The spring leaf is a planar metal plate. At the right-hand end of the leaf spring, there are furthermore situated two vertically running lugs 10b with rectangular cross section. The lugs can also be seen from the plan view of FIG. 3. There, it can also be seen that the lugs are received in corresponding apertures of the walls of the foundation plate 201, whereby the leaf spring 10 is fixed to the foundation plate 201 and thus to the housing 2. Alternatively, the leaf spring, in its right-hand region, may also be fixed by means of other connecting methods such as adhesive bonding, riveting or the like to the foundation plate 201, and the vertical lugs are then omitted.

The shape of the valve body 9 can also be seen in FIG. 3. As can be seen, the valve body 9 has, in part, a considerably smaller width than the spring leaf 10a, situated therebelow, of the leaf spring 10. At the left-hand front end of the valve body 9, there is provided a lug 9a (FIG. 1) with an undercut, into which the front end of the spring leaf 10a is inserted. In this way, the spring leaf 10a and the underside of the valve body 9 are fastened to one another. Additionally, the valve body may be adhesively bonded to the leaf spring. On the underside of the spring leaf 10a, there is furthermore provided a sealing element 14 composed of soft plastic, which sealing element, when the air port 3 is closed, bears on the conical running nozzle seat of said air port and ensures a sealing closure.

On the underside of the valve body 9, at its right-hand end, there is furthermore provided a protuberance 9b which makes contact with the top side of a portion of the spring leaf 10a which bears on the foundation plate 201. This protuberance facilitates the lift-off of the leaf spring during the opening of the valve flap 8, as will be described in more detail further below. Also situated on the top side of the valve body 9 is a shield 13 with two upwardly open slots through which the two straight portions 701 and 702 of the SMA wire 7 are led. By means of this shield, a major part of the SMA wire 7 is insulated from the air flow in the region of the air ports. In this way, a consistent characteristic of the shape memory alloy of the wire is ensured, because the temperature of the wire is not varied by air flowing past, and the characteristics of said wire are not influenced. The shield 13 may also be formed on the lid 10 rather than on the valve body 9. In this way, the installation of the SMA wire is facilitated, because it no longer needs to be introduced through slots during its installation into the housing. The lid 202 is mounted only when the wire has already been installed.

The functioning of the opening and closing of the valve flap 8 by means of the SMA wire 7 will be discussed below. FIG. 1 shows the closed state of the air port 3. To open said air port, electrical heating current is fed to the SMA wire 7 via the contact pins 15, which heating current causes the wire 7 to warm up. In a manner known per se, the warming of the wire results in a conversion of the crystalline structure of the shape memory alloy, causing it to shorten. This shortening in turn has the result that a force in the curved portion 703 of the wire acts on the cylinder 11 and thus on the valve flap 8 as a whole. As a consequence, with elastic bending of the spring leaf 10a, the leaf spring 10 and thus the valve flap 8 are pulled upward. Here, the spring leaf 10a detaches, in the region of the protuberance 9b, from its corresponding bearing on the top side of the foundation plate 201. Here, FIG. 2 shows the lifted-off state of the valve flap 8 with open air port 3.

After the valve has reached the open position shown in FIG. 2, said end position is detected by means of a suitable limit switch (not shown). As a consequence, the heating current is reduced in order to hereby avoid thermal and mechanical overloading of the wire 7. To close the air port 3, the feed of heating current is finally shut off entirely, with the consequence that, owing to the shape memory alloy, the wire expands again and, by means of the resetting force of the spring 12, a movement of the valve flap 8 downward, and thus the closing of the air port 3, are effected. If appropriate, the use of a separate spring 12 for generating the resetting force may also be omitted. The resetting force may rather also be generated by means of a suitable prestress of the spring leaf 10a of the leaf spring 10.

The arrangement for the mechanical coupling of SMA wire 7, leaf spring 10 and valve body 9 has, in FIG. 1 and FIG. 2, been selected such that, in this way, a mechanism is formed which firstly converts the horizontal stroke of the SMA wire 7 (that is to say the shortening thereof when the heating current is applied) into a vertical stroke of the valve flap 8, and secondly enlarges the stroke of the valve flap 8 in relation to the stroke of the SMA wire 7. This is achieved by means of a lever arrangement or a rocker. The relatively short lever, which engages on the SMA wire 7, is realized by the spacing between the wire 7 and the spring leaf 10a. The relatively long lever, which acts on the valve flap 8 or the sealing element 14, is realized by the spacing between the protuberance 9b and the center of the sealing element 14 (that is to say the nozzle seat). By means of this arrangement, a diversion of the force direction of the SMA wire 7 through approximately 90° in the direction of the stroke of the valve flap 8 is also realized. If appropriate, other embodiments are also conceivable in which the force direction is changed by a different angle. The force direction is preferably changed by an angle of between 50° and 130°, in particular between 70° and 110°. A diversion of the force direction through 90° permits a particularly compact construction of the valve.

The use of a leaf spring 10 for the purposes of opening and closing the air port 3 has particular advantages. In particular, it can be achieved in this way that the valve flap 8 is guided in terms of its movement and always makes contact at the same position, by means of its sealing element 14, with the nozzle seat. Here, the leaf spring 10 simultaneously supports the longitudinal force during actuation of the valve flap against the foundation plate 201. By contrast to hinges, the leaf spring permits play-free and low-friction mounting of the valve flap, whereby the reliability of the opening and closing of the air port is improved. At the same time, by means of this mounting, a peeling movement of the valve flap during the opening process is achieved, whereby so-called "sticking" of the valve owing to an adhering sealing element 14 is prevented.

As can be seen in FIG. 3, the two air ports 3 and 3' with the corresponding valve flaps are arranged offset with respect to one another in the region of the working port 4. The electrical contacting of the two SMA wires is realized via the contact pins 15 at the right-hand end of the housing. Here, a common contact pin 15 is utilized as a ground pin for both SMA wires. The ground pin 15 is connected to the adjacent crimp elements of the two wires 7 via the conductive web 22. By means of the arrangement, shown in FIG. 3, of all three air ports 3, 3' and 4 on one side of the housing 2, it is ensured that the air stream flowing via said air openings is limited to a small region in the housing, and thus comes into contact as little as possible with the SMA wires, whereby a consistent contraction and expansion characteristic of the wires is ensured. This is additionally assisted by the shields 13 on the top side of the valve body 9, as has already been discussed above.

Figure 4:
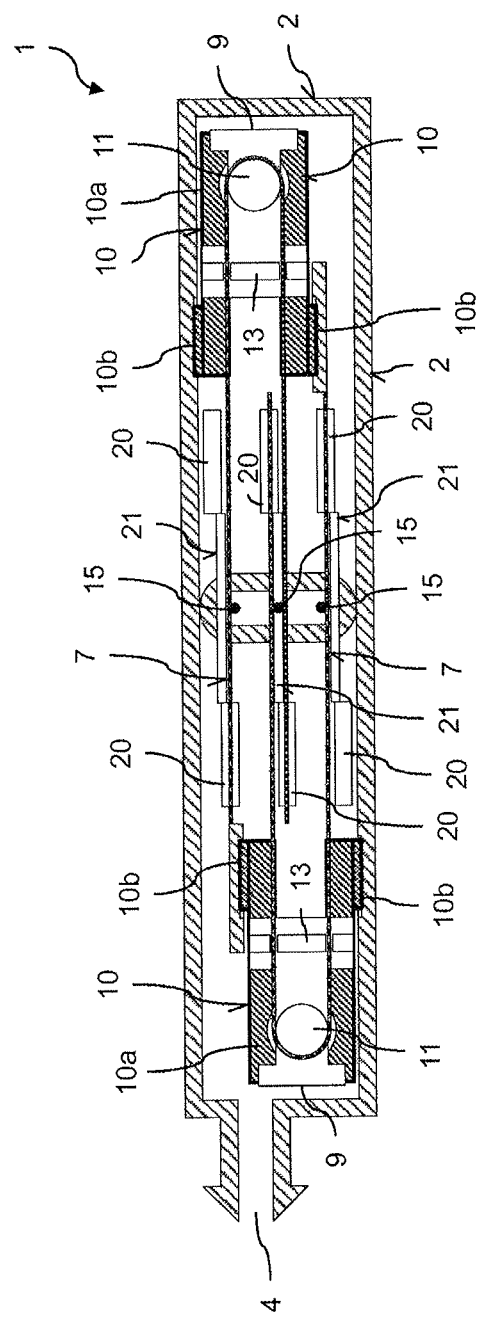
FIG. 4 shows a plan view of a second embodiment of a valve according to an aspect of the invention.

FIG. 4 shows a plan view of a modified, second embodiment of a valve according to an aspect of the invention. This embodiment differs from the embodiment of FIG. 3 in that the air ports 3 and 3' are no longer arranged on the same side of the valve housing 2. Rather, only the air port 3' is situated at the end of the valve housing adjacent to the working port 4, whereas the exhaust-air port 3 is provided at the opposite end of the valve housing 2. A particularly compact construction of the valve is achieved in this way.

The embodiment of FIG. 4 furthermore differs from the embodiment of FIG. 3 in that a single-piece component 21 composed of a pair of crimp elements 20 can be used for the fastening of the wires 7 to the housing 2. The components 21 are inserted into the foundation plate 201 and have the crimp elements 20 at both of their ends. There are three such components 21, wherein, in the upper component 21, only the left-hand crimp element 20 and, in the lower component 21, only the right-hand crimp element 20 is utilized for wire fixing purposes. By contrast, in the central component 21, both crimp elements 20 are used for the fixing of the wires. Analogously to FIG. 3, it is again the case that three contact pins 15 are provided, wherein the central contact pin 15 forms a common ground connection for both SMA wires 7. The contact pins make contact with the wires, for example may be welded thereto. In this way, the feed of heating current to the wires is ensured.

Figure 5:
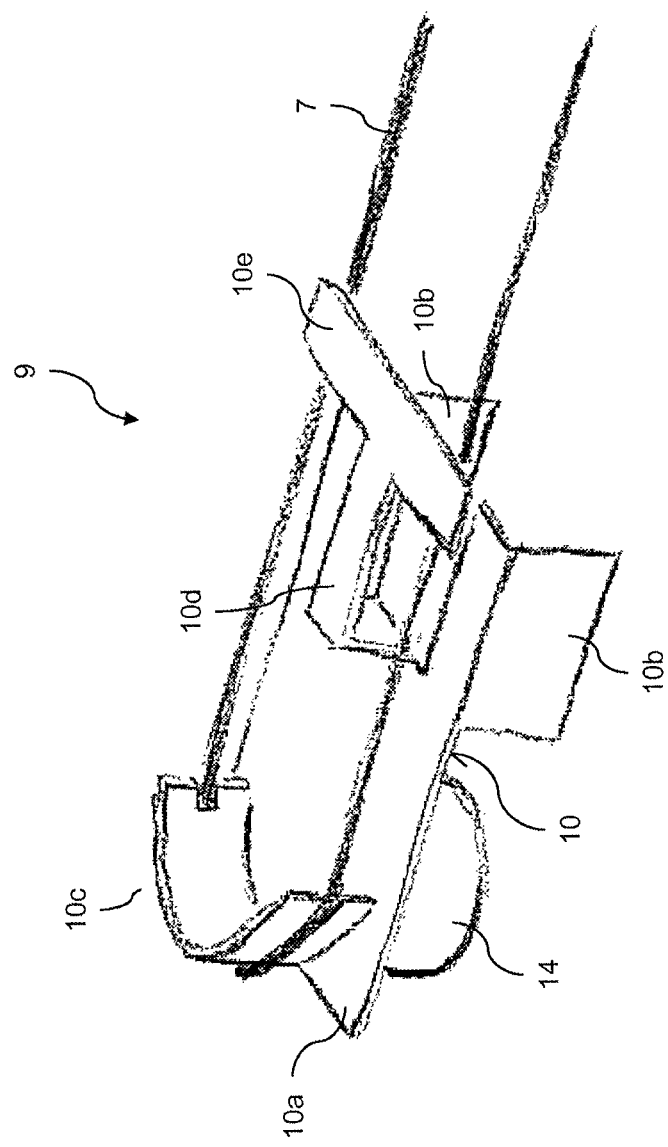
FIG. 5 is a perspective illustration of a modified embodiment of a valve flap used in the valve according to an aspect of the invention.

FIG. 5 shows, in a perspective illustration, a modification of a valve flap that can be used in the valve according to an aspect of the invention. By contrast to the valve flap of the preceding embodiments, the valve flap 9 of FIG. 5 is now composed merely of a leaf spring 10 and a sealing element 14, without a valve body composed of plastic being provided. Simple manufacture of the valve flap is ensured in this way.

Analogously to FIG. 1, the leaf spring of FIG. 5 comprises the spring leaf 10a and two vertically running lugs 10b which, by contrast to the preceding embodiments, now extend downward. By means of the lugs 10b, fixing of the leaf spring or of the valve flap in the valve housing 2 is again realized. The leaf spring is manufactured from metal and, aside from the lugs 10b, comprises the semicircular portion 10c and an upwardly bent portion 10d, which ends at a wing 10e which runs perpendicular to the extent direction of the straight portions of the SMA wire 7. The lugs 10b, the semicircular portion 10c, the bent portion 10d and the wing 10e are formed by punching and bending of a corresponding metal plate, such that the leaf spring forms an integral component.

For the movement of the valve body 9, it is again the case that the wire 7 which is diverted about the semicircular portion 10c is contracted. As a result of the contraction, force is transmitted via the semicircular portion 10c to the leaf spring 10, in order to hereby realize a lift-off of the valve flap with the corresponding sealing element 14 from the nozzle seat. The geometrical shape of the leaf spring is in this case selected such that, when the end position is reached in the open state of the nozzle seat, the metallic wing 10e electrically bridges the two straight portions of the wire 7. This leads to a change in resistance of the SMA wire, which is detected by means of a suitable resistance measurement, such that, in this way, the end position of the wire can be detected, and the heating current can subsequently be reduced.

The above-described embodiments of an aspect of the invention have numerous advantages. In particular, by means of a lever arrangement using a leaf spring, an enlargement and diversion of the stroke of the SMA wire is effected. The stroke of the SMA wire is very small (for example contraction by only approximately 0.5% to 1% of its length), whereby the service life thereof is increased. This stroke is converted by means of the lever arrangement into a stroke of the valve flap which is generally greater by a factor of 2 to 3 than the stroke of the SMA wire. Through the use of a leaf spring, a removal of the sealing element from the nozzle seat with peeling action is also achieved, whereby even strongly adhering sealing elements can be reliably lifted off from the nozzle seat. Furthermore, a simple and reliable play-free mounting of the valve flap is made possible.

By means of a foundation plate, it is furthermore possible to ensure a region in the valve housing which is separated from the air chamber. It is then possible for electronic components to be arranged in said region, which electronic components are protected from an air flow and from air humidity in the air chamber. Furthermore, through the use of a shield through which the SMA wire is led, the flow of the air flow past said wire can be reduced, in order to hereby ensure a uniform characteristic of the wire.

Furthermore, by means of the arrangement of the valve seats in the direction of the lid of the valve housing and the integral form of the seats in the foundation plate, simple manufacture and easy assembly of the valve are ensured. In particular, the actuation mechanism of the valve flaps is arranged in an easily accessible region of the housing, such that the installation and quality control of the components are made easier.

LIST OF REFERENCE SIGNS

1 Valve
2 Valve housing
201 Foundation plate
202 Lid
203 Base cover
3, 3', 4 Air ports
5 Air channel
6 Damping element
7 SMA wire
701, 702 Straight portions of the wire
703 Curved portion of the wire
8 Valve flap
9 Valve body
9a Lug
9b Protuberance
10 Leaf spring
10a Spring leaf
10b Lug
10c Semicircular portion
10d Bent portion
10e Wing
11 Cylinder
12 Spiral spring
13 Shield
14 Sealing element
15 Contact pin
16 Leadthrough
17 Circuit board
18 Air chamber
19 Region separated from the air chamber
20 Crimp elements
21 Component with crimp elements
22 Conductive web

The invention claimed is:

1. A pneumatic valve, comprising:
a valve housing in which there is provided an air chamber with at least one or more air ports wherein at least one of the one or more air ports can be opened and sealingly closed by a movable valve flap, wherein the valve flap is mechanically coupled to an SMA element composed of a shape memory alloy, wherein the SMA element deforms as a result of a supply of electrical heating current and hereby effects a predefined movement of the valve flap for the purposes of opening or closing the at least one of the one or more air ports, wherein the deformation of the SMA element is reversed when the supply of the electrical heating current is ended, and a reversal of the predefined movement of the SMA element is hereby effected,
the valve flap comprises a leaf spring with a spring leaf, wherein the leaf spring is held rotationally fixedly relative to the valve housing and interacts with the SMA element such that a stroke of the SMA element caused by the deformation thereof is converted into a stroke of the valve flap by elastic bending of the spring leaf of the leaf spring, wherein the stroke of the valve flap is greater than the stroke of the SMA element,
wherein, the leaf spring interacts with the SMA element such that the stroke of the valve flap is diverted relative to the stroke of the SMA element.

2. The pneumatic valve as claimed in claim 1, wherein an angle by which the stroke of the valve flap is diverted relative to the stroke of the SMA element lies between 50° and 130°.

3. The pneumatic valve as claimed in claim 1, wherein the SMA element is a wire which extends substantially in a plane and which is contracted as a result of a supply of the electrical heating current and which hereby effects the predefined movement of the valve flap.

4. The pneumatic valve as claimed in claim 3, wherein the wire runs substantially parallel to the spring leaf of the leaf spring with a predefined spacing thereto.

5. The pneumatic valve as claimed in claim 3, wherein the wire comprises two straight-running portions with an interposed curved portion, wherein the stroke of the wire is transmitted via the curved portion to the valve flap, wherein the curved portion turns the direction of extent of the wire through 180°.

6. The pneumatic valve as claimed in claim 1, wherein the spring leaf of the leaf spring comprises a bearing region which bears on a portion of the valve housing, wherein the bearing region lifts off from the portion of the valve housing during the elastic bending of the spring leaf.

7. The pneumatic valve as claimed in claim 1, wherein a resetting force acts on the valve flap, which resetting force effects the reversal of the predefined movement of the valve flap when the supply of the heating current is ended, wherein the resetting force is generated by the leaf spring and/or by a separate spring.

8. The pneumatic valve as claimed in claim 1, wherein the valve flap comprises a body which has a first side, which points towards the respective air port, and a second side, which is a side situated opposite the first side, wherein a portion of the spring leaf which is moved as a result of the elastic bending of the leaf spring is arranged on the first side, and wherein the SMA element is mechanically coupled to the valve flap on the second side.

9. The pneumatic valve as claimed in claim 1, wherein the valve housing comprises a foundation plate composed of non-conductive material, which foundation plate divides the interior of the valve housing into the air chamber and a region separated from the air chamber, wherein, in the separated region, there is arranged an electronic control unit for controlling the valve flap or valve flaps for the purposes of opening or closing the one or more respective air ports.

10. The pneumatic valve as claimed in claim 9, wherein the portion of the valve housing on which the bearing region of the spring leaf bears is a part of the foundation plate on its side pointing toward the air chamber.

11. The pneumatic valve as claimed in claim 1, wherein the SMA element is led through a shield wall which shields a sub-portion of the SMA element from the respective air port, wherein the shield wall is fastened to the valve flap or to the valve housing.

12. The pneumatic valve as claimed in claim 1, wherein, on the leaf spring, there is formed a conductive portion which, when an end position of the valve flap is reached when the electrical heating current is supplied, electrically bridges a sub-portion of the SMA element.

13. The pneumatic valve as claimed in claim 1, wherein a non-controllable air port is situated at one end of the valve housing, and the valve comprises two air ports which belong to the at least one part of the air ports with valve flap, wherein the two air ports are arranged at the one end of the valve housing at which the non-controllable air port is situated, or wherein one of the two air ports is arranged at the one end of the valve housing at which the non-controllable air port is situated, and the other of the two air ports is arranged at an opposite end of the valve housing in relation to the one end.

14. The pneumatic valve as claimed in claim 1, wherein the valve is provided for the filling and/or emptying of at least one elastic air bladder in a device for the pneumatic adjustment of a seat in a transport.

15. The pneumatic valve as claimed in claim 1, wherein an angle by which the stroke of the valve flap is diverted relative to the stroke of the SMA element lies between 70° and 100°.

16. The pneumatic valve as claimed in claim 1, wherein an angle by which the stroke of the valve flap is diverted relative to the stroke of the SMA element is 90°.

17. A pneumatic valve comprising:
a valve housing in which there is provided an air chamber with at least one or more air ports wherein a at least one part of the one or more air ports can be opened and sealingly closed by a movable valve flap, wherein the valve flap is mechanically coupled to an SMA element composed of a shape memory alloy, wherein the SMA element deforms as a result of a supply of electrical heating current and hereby effects a predefined movement of the valve flap for the purposes of opening or closing the at least one or more air ports, wherein the deformation of the SMA element is reversed when the supply of the electrical heating current is ended, and a reversal of the predefined movement of the SMA element is hereby effected,
the valve flap comprises a leaf spring with a spring leaf, wherein the leaf spring is held rotationally fixedly relative to the valve housing and interacts with the SMA element such that a stroke of the SMA element caused by the deformation thereof is converted into a stroke of the valve flap by elastic bending of the spring leaf of the leaf spring, wherein the stroke of the valve flap is greater than the stroke of the SMA element,
wherein, the leaf spring interacts with the SMA element such that the stroke of the valve flap is diverted relative to the stroke of the SMA element,
wherein the SMA element is a wire which extends substantially in a plane and which is contracted as a result of a supply of the electrical heating current and which hereby effects the predefined movement of the valve flap,
wherein the wire runs substantially parallel to the spring leaf of the leaf spring with a predefined spacing thereto, and
wherein the wire comprises two straight-running portions with an interposed curved portion, wherein the stroke of the wire is transmitted via the curved portion to the valve flap, wherein the curved portion turns the direction of extent of the wire through 180°.

18. The pneumatic valve as claimed in claim 17, wherein an angle by which the stroke of the valve flap is diverted relative to the stroke of the SMA element is 90°.

* * * * *